(12) United States Patent
Dranko et al.

(10) Patent No.: US 11,479,224 B2
(45) Date of Patent: Oct. 25, 2022

(54) SECONDARY AND COMPLEMENTARY BRAKE ACTUATION RETROFIT

(71) Applicant: Locomation, Inc., Sewickley, PA (US)

(72) Inventors: Brad Allen Dranko, Pittsburgh, PA (US); Raymond Joseph Russell, Beaver, PA (US)

(73) Assignee: Locomation, Inc., Pittsburgh, PA (US)

( * ) Notice: Subject to any disclaimer, the term of this patent is extended or adjusted under 35 U.S.C. 154(b) by 136 days.

(21) Appl. No.: 16/945,970

(22) Filed: Aug. 3, 2020

(65) Prior Publication Data

US 2021/0039618 A1 Feb. 11, 2021

Related U.S. Application Data

(60) Provisional application No. 62/883,152, filed on Aug. 6, 2019.

(51) Int. Cl.
| | | |
|---|---|---|
| *B60T 13/68* | (2006.01) | |
| *B60T 8/88* | (2006.01) | |
| *B60T 8/17* | (2006.01) | |
| *B60T 8/38* | (2006.01) | |
| *B60T 7/06* | (2006.01) | |
| *B60T 7/20* | (2006.01) | |
| *B60T 8/171* | (2006.01) | |

(52) U.S. Cl.
CPC ............. *B60T 13/683* (2013.01); *B60T 7/06* (2013.01); *B60T 7/20* (2013.01); *B60T 8/171* (2013.01); *B60T 8/1708* (2013.01); *B60T 8/38* (2013.01); *B60T 8/885* (2013.01); *B60T 2270/88* (2013.01)

(58) Field of Classification Search
CPC ...... B60T 13/683; B60T 8/885; B60T 8/1708; B60T 2270/88; B60T 8/38; B60T 7/06; B60T 7/20; B60T 8/171
See application file for complete search history.

(56) References Cited

U.S. PATENT DOCUMENTS

| | | | |
|---|---|---|---|
| 6,364,432 B1 * | 4/2002 | Mixon | B60T 8/248 303/7 |
| 6,702,400 B1 | 3/2004 | Eberling | |
| 7,520,572 B2 | 4/2009 | Hatipoglu | |
| 10,647,329 B2 * | 5/2020 | Cohen | G05D 1/0061 |

(Continued)

*Primary Examiner* — Pamela Rodriguez
(74) *Attorney, Agent, or Firm* — VLP Law Group LLP; David J. Thibodeau, Jr.

(57) ABSTRACT

A retrofit pneumatic circuit complements an existing factory braking system to preserve the original function of the driver's foot pedal while also adding the ability for a computer to actuate the brakes separately and independently. In the event where both the primary and secondary drivers are actuating the brakes at any time, the braking force applied is the maximum of the two. In the preferred approach, a shuttle valve is connected between a primary proportional valve and a copy of that proportional valve. Directional control valves are also included to isolate both the input and the output portions of the secondary circuit in order to enforce positive shutdown of computer control. One directional valve blocks a supply pressure to prevent bleeding of the system in any situation where pressure is requested when computer control is supposed to be disabled. A second directional valve vents any built-up pressure to the atmosphere, so that any residual pressure does not actuate the brakes after computer control is disabled.

9 Claims, 3 Drawing Sheets

(56) References Cited

U.S. PATENT DOCUMENTS

| | | |
|---|---|---|
| 10,730,499 B2 * | 8/2020 | Otremba .............. B60T 13/662 |
| 2016/0334790 A1 | 11/2016 | Rust et al. |
| 2018/0136655 A1 | 5/2018 | Kim et al. |
| 2019/0001947 A1 | 1/2019 | Lowe |
| 2019/0152459 A1 | 5/2019 | Dieckmann et al. |

* cited by examiner

SECONDARY AND COMPLEMENTARY BRAKE ACTUATION RETROFIT

CROSS REFERENCE TO RELATED APPLICATIONS

This application claims priority to a U.S. Provisional Patent Application entitled "Secondary and Complementary Brake Actuation Retrofit" Ser. No. 62/883,152 filed Aug. 6, 2019, the entire contents of which are hereby incorporated by reference.

BACKGROUND

Consumers and professional drivers alike are increasingly comfortable with the idea of autonomous vehicles, which offer the promise of convenience, lower operating cost, reduced traffic congestion, improved safety, and other benefits. A January 2018 Deloitte Insights survey reflected this trend. (See https://www2.deloitte.com/insights/us/en/industry/automotive/advanced-vehicle-technologies-autonomous-electric-vehicles.httml) That same study, however, suggests acceptance actually continues to lag because of market fundamentals. Unfamiliarity, fluctuating demand, limited availability, affordability, and the regulatory environment—continue to slow the adoption of self-driving vehicles.

At the current pace it will likely take many more years before even the long-haul trucking industry is primarily using driverless vehicles.

SUMMARY

Some of the benefits of autonomy can be provided today by retrofitting existing vehicles as a first step in a clear roadmap to higher levels of autonomy in the future.

Described herein is a retrofit to an existing braking system, such as the pneumatic braking system in a semi-truck, which supports dual control of the braking system by a human driver and a computer. The retrofit includes a complementary pneumatic circuit that is added to an existing brake system. The retrofit pneumatic circuit preserves the original function of the driver's (the "primary driver's") foot pedal while also adding the ability for a computer (or other "secondary driver") to actuate the brakes separately and independently. In the event where both the primary and secondary drivers are actuating the brakes at any time, the force applied to the braking system will be the maximum of the two.

The added retrofit pneumatic circuit includes a copy (PV2) of a proportional valve (PV1) associated with a primary brake system input (such as a driver's foot pedal), connected to a shuttle valve. The proportional valves PV1, PV2 may be of the type that convert shaft deflection input to a pressure output. For example, a computer-controlled motor may drive a planetary gearbox which drives a rotary shaft with a cam that is then used to push a piston whose deflection is the input to the proportional valve copy PV2.

Directional control valves are also included to isolate both the input and the output portions of the added pneumatic circuit in order to enforce positive shutdown of computer control and to prevent certain malfunctions. One way to accomplish this is to have, on the input side, a first directional valve (DV1) arranged to block the supply pressure. This prevents bleeding the system in a situation where pressure is requested but computer control is supposed to be disabled. On the output side, a second directional valve (DV2) is used to vent any built-up pressure to atmosphere so that any residual pressure does not actuate the brakes after computer control is disabled.

This solution is believed to be an improvement over other approaches such as:
   a. a computer controlled actuator that pushes on the very same physical pedal as the human driver; or
   b. any system that changes the original brake actuator; or
   c. any approach that requires a human driver to do anything extra to actuate the brakes in an emergency Although its primary use is expected to be as a retrofit of an existing vehicle where a human is the primary driver, the added pneumatic circuit may be applied and relevant to any autonomous vehicle that retains the capacity for any other driver (human or not) to control it in some way.

The approach may also enable advantages in terms of function, performance, quality, or safety of autonomy systems.

The approach may also be a way to obtain easier and earlier operational approval and certification of both the intrinsic braking system pneumatics and the human interface aspects.

DETAILED DESCRIPTION OF AN EMBODIMENT

Figure 1:
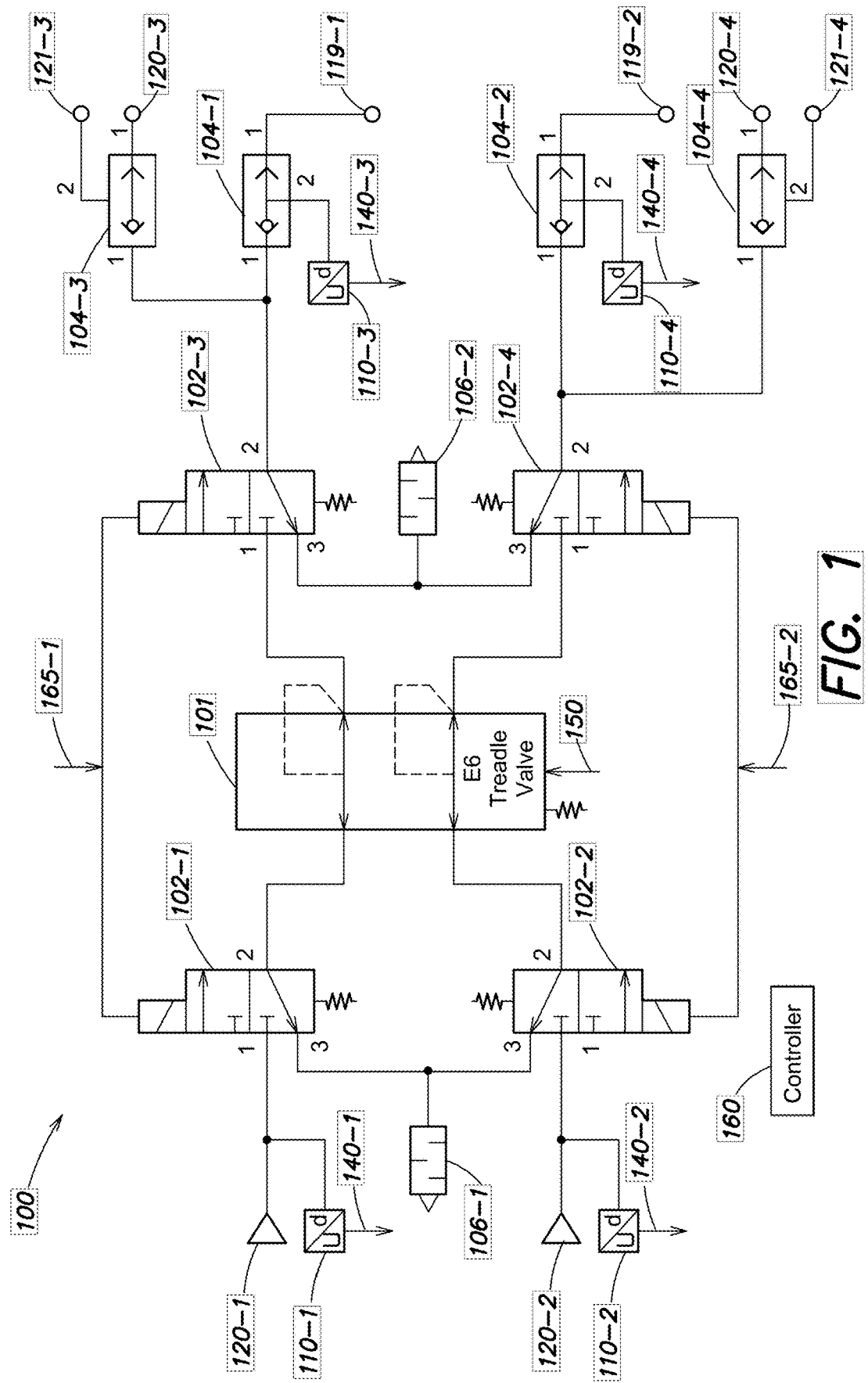
FIG. 1 is a diagram of a brake activation retrofit assembly.

FIG. 1 is a diagram of an example complementary brake activation retrofit assembly 100. The assembly 100 includes a retrofit treadle valve 101, a set of four solenoid-operated poppet valves 102-1. 102-2, 102-3, 102-4, a first pair of shuttle valves 104-1, 104-2 and a second pair of shuttle valves 104-3, 104-4. The assembly 100 may also include mufflers 106-1, 106-2 and pressure transducers 110-1, 110-2, 110-3, 110-4.

Retrofit treadle valve 101 is a complementary activation input (e.g., PV2) to the vehicle's main pneumatic braking system, typically installed at the factory. (Referred to herein as the "factory braking system", with the understanding that the vehicle braking system may also be installed subsequent to manufacture of the rest of the vehicle). This retrofit treadle valve 101 is preferably a copy (or at least a functional equivalent) of another proportional valve (e.g., PV1) (not shown in the drawing). The other proportional valve PV1 may, for example, be associated with a factory braking system input (such as the driver's foot pedal). Retrofit treadle valve 101 may be a proportional valve of the type that converts a shaft deflection input to a pressure output. When the secondary driver is a computer, for example, of a self-driving vehicle, a motor may drive a planetary gearbox which drives a rotary shaft with a cam that is used to push a piston whose deflection is the input to retrofit treadle valve 101.

Connections into the assembly 100 are also provided from the vehicle's primary brake accumulator 120-1 and secondary brake accumulator 120-2. These primary and secondary brake accumulators (or other pneumatic pressure supplies or reservoirs) are most often the factory installed parts of the vehicle's pneumatic braking system of any modern truck. In most modern trucks, primary and secondary systems are isolated from each other so that, in the event of a failure in one, the other still provides some brake control for safety purposes.

Pressure transducers 110-1, 110-2 monitor the respective supply pressures provided by the primary and secondary accumulators 120-1, 120-2. In one example system, these supply pressures are in the range of 90-135 pounds per square inch (PSI). Signal outputs 140-1, 140-2 from these transducers 110-1, 110-2 (which may be in a range from 0 to 5 volts) are input to a controller, such as a programmable controller 160 with suitable analog to digital converter circuits. The controller 160 may, for example, monitor the supply pressures and trigger a fault when they fall outside a predetermined range. This arrangement may help meet regulatory requirements, such as the United States' Federal standards that specify minimum maintained pressures in an operating commercial vehicle. The controller 160 may be the same programmable processor that serves other functions, such as a processor that executes an autonomous driving algorithm, or it may be a separate processor.

Supply pressures from the respective primary and secondary pneumatic inputs provided by the accumulators 120-1, 120-2, are also provided to respective directional poppet valves 102-1, 102-2. These valves 102-1, 102-2 are a solenoid-controlled, three-port, two-position valve. They serve to block any air coming in from the respective primary and secondary accumulators 120-1, 120-2 when the system 100 is in an off or deactivated state. FIG. 1 shows these valves 102-1, 102-2 in this deactivated state, as controlled by a respective hardware enable signal input (which originates from a controller). In this state, the respective primary and secondary pneumatic supplies are disconnected from the system, with the input ports to the retrofit treadle valve 101 shunted to a vent (or muffler) 106-1. In this state, the poppet valves 102-1, 102-2 thus prevent any accidental actuation of the retrofit treadle valve 101 from outputting any pressure to the rest of the braking system. The poppet valves 102-1, 102-2 also avoid problems where the retrofit treadle valve 101 might be oscillating on or off while the secondary system is supposed to be deactivated, which might otherwise begin to drain the reservoir(s) 120-1, 120-2.

As mentioned previously, retrofit treadle valve 101 typically accepts a computer-controlled input 150 that provides a variable pressure, complimentary input to the braking system, such as may be provided by controller 160 or some other processor.

A set of poppet valves 102-3, 102-4 on the output side of the retrofit treadle valve 101 perform essentially the same purpose as the valves 102-1, 102-2 on the input side. That is, they block the output of the retrofit treadle valve 101 when the system 100 is deactivated, preventing any pressure further upstream in the system. Note that the solenoids to these output side valves 102-3, 102-4 are also controlled by the same hardware enable signals as the input side valves 102-1, 102-2.

Another set of pressure transducers 110-3, 110-4 permit the controller 160 to monitor or diagnose the output side poppet valves 102-3, 102-4. Outputs 140-3, 140-4 from these transducers may also be digitized and fed to the controller 160.

Each output-side poppet valve 102-3, 102-4 in turn feeds one pneumatic input (the left hand port 1) of a respective shuttle (or circulation) valve 104-1, 104-2. The other pneumatic input of each shuttle valve (e.g., the right hand port 1) is connected to the respective factory, primary or retrofit treadle valve port. The shuttle valves 104-1, 104-2 thus select the greater of the two treadle valve inputs and shunt it to a corresponding output port (port 2) 119-1, 119-2. An example shuttle valve 104 is basically a tube with a ball inside, such that pressure on one input port pushes that ball in the tube and blocks the other input port. However other types of shuttle valves may be used.

This shuttle valve arrangement permits a human driver to have ultimate control over what a computer controller 160 is attempting to do with the brakes. In other words, when the computer controller 160 is only calling for a small braking pressure, the human driver can still press on the factory brake pedal and produce an even greater braking pressure, overriding what the computer 160 is asking for.

Also shown is a second set of shuttle valves 104-3, 104-4, in some embodiments, that are also connected to respective ones of the output-side poppet valves 102-3, 102-4. The other pneumatic input of these valves is the respective factory or retrofit treadle valve. This second set of shuttle valves 104-3, 104-4 control the force applied to a factory tractor protection valve (see FIG. 3) via output ports (port 2) 121-3, 121-4. These shuttle valves shunt whichever pressure input is higher for delivery to the tractor protection valve. The tractor protection valves, in turn, protect the tractor air brake system when a trailer braking system is not connected. Note that this arrangement protects the tractor air brake system while also maintaining isolation of the factory primary and secondary pneumatic systems 120-1, 120-2.

The complementary brake activation retrofit assembly 100 is switched on or off by activating or deactivating the hardware enable signal inputs 165-1, 165-2 to the four poppet valves 102. In the activated state, port 2 of each poppet 102 is now connected to port 1, permitting air to flow into and out of the retrofit treadle valve 101. It should be noted that the poppet valves 102 are preferably directional (as indicated by the arrows) to prevent activation in case of a low pressure condition. That is, the directional nature of the valves 102 ensures that they are only activated electronically via the solenoid inputs, and not accidentally via some pneumatic condition.

This arrangement also ensures that the factory braking system continues to operate normally, and defaults to a factory operation, in a case of loss of electrical power to the controller or solenoids or other parts of the assembly 100. That is, when the hardware enable signal is off, the shuttle valves 104 still operate. In this state, there will be no pressure output from the respective poppet valves 102-3, 102-4, and only the operator's foot supplies pressure (via the factory treadle valve) to feed the factory pneumatics (primary and/or secondary). Because the shuttle valves are a pneumatic-only component, and not an electronic component, in the case of loss of power, the human operator will still be able to apply the brakes normally.

In the de-energized state as shown in FIG. 1, if there happens to be excess pressure, it is shed (bled) through the vents (mufflers) 106-1, 106-2. These vents 106 also serve to bleed off any residual pressure when the system 100 is switched from the active to the inactive state.

Figure 2:
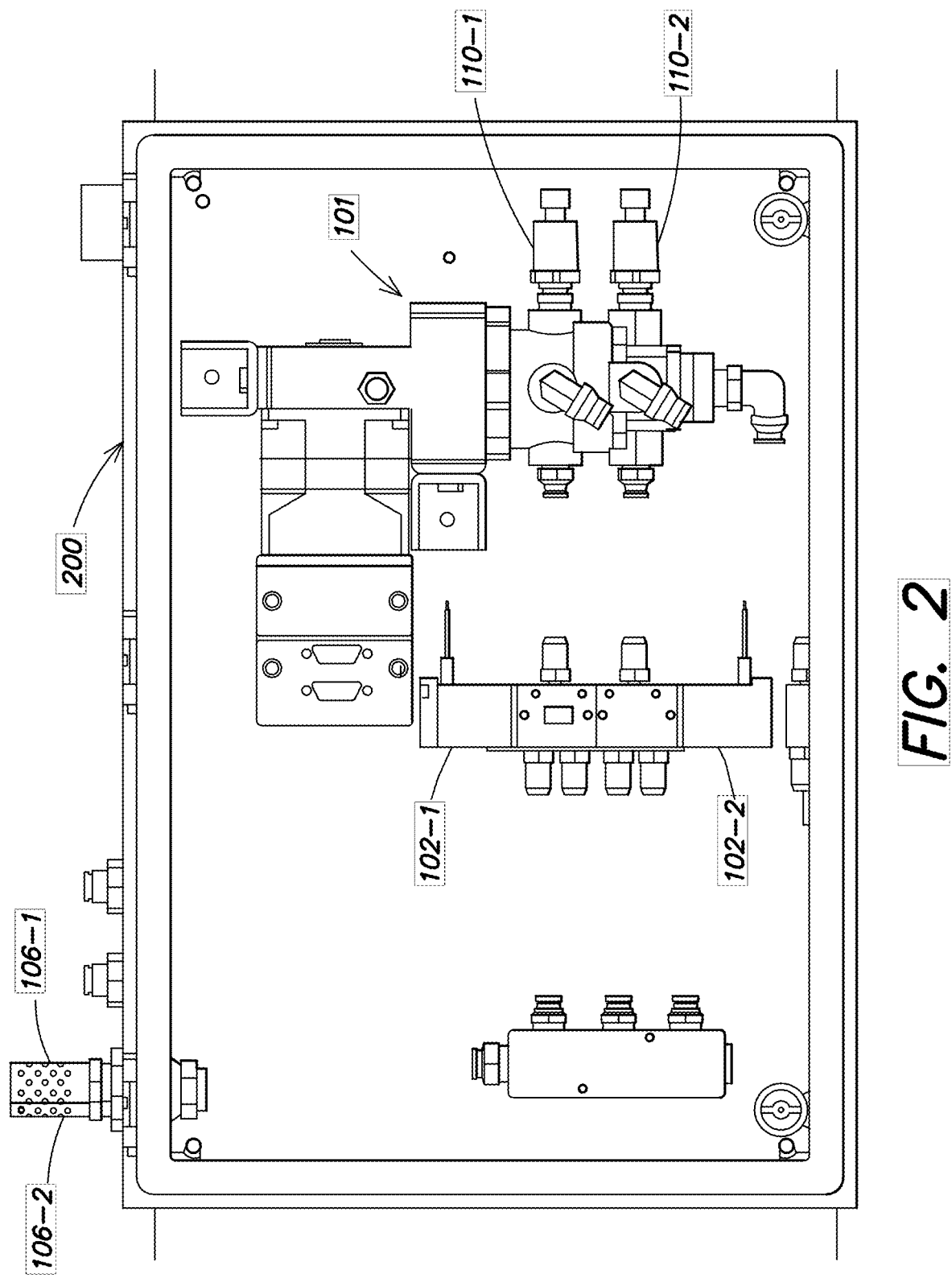
FIG. 2 is one possible way to package the components shown in FIG. 1.

FIG. 2 shows one possible way to package the components shown in FIG. 1. Some or all of the component parts shown in FIG. 1 can be neatly fit into a convenient, small rectangular housing 200 that can be easily retrofit to existing vehicle systems. In this view the retrofit treadle valve 101, some of the poppet valves 102, and transducers 110 are visible; it is to be understood that some the other components shown in FIG. 1 are not visible in this particular view but may also be packaged in the same housing 200.

Figure 3:
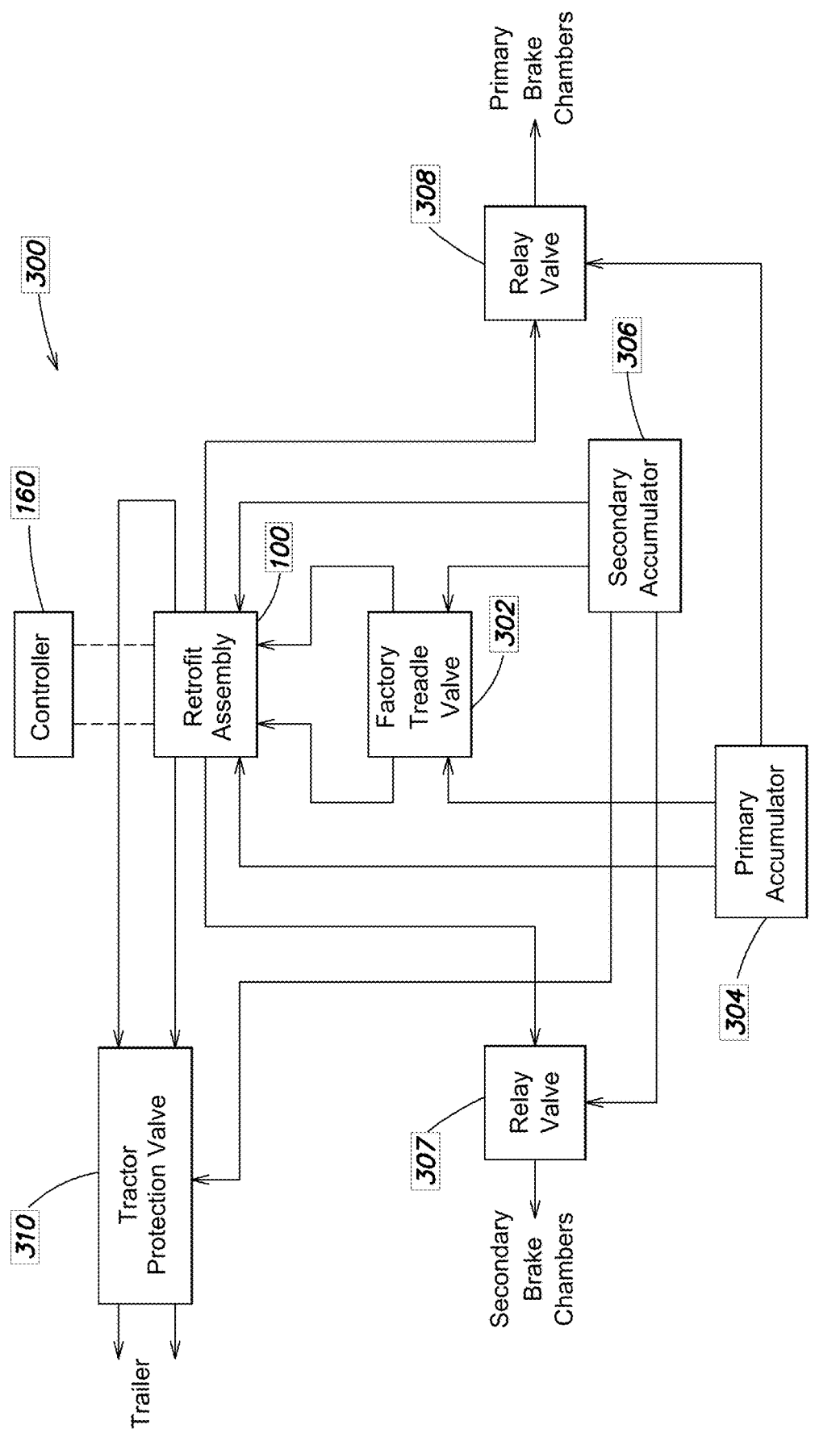
FIG. 3 is a diagram showing the retrofit assembly t of FIG. 1 in the context of its connections to a factory vehicle brake pneumatic system.

FIG. 3 illustrates how the retrofit assembly 100 may be connected to a standard or factory pneumatic braking system 300 of a typical tractor-trailer. Such a standard factory system 300 includes the factory treadle valve 302 as already described, a primary accumulator 304, a secondary accumulator 306, a primary brake chamber relay valve 307, a secondary brake chamber relay valve 308, and tractor protection valve 310. Note that air lines connect the retrofit assembly 100 to every other element of the diagram, except the controller 160, which is connected electrically. The controller 160 may or may not be disposed in the same housing as the retrofit assembly 100.

The retrofit pneumatic circuit 100 can be installed by choosing convenient locations on the truck to split four air lines and then installing shuttle valves, in-place, to splice the two cut ends of each split line back together. Then, the retrofit circuit shown in FIG. 1 is connected to the shuttle valves to provide a second source of air to each shuttle valve. The four original lines to split are the lines that run:

1. From the factory treadle valve 302 to the primary relay valve 308
2. From the factory treadle valve 302 to the tractor protection valve 310
3. From the factory treadle valve 302 to the secondary relay valve 307
4. From the factory treadle valve 302 to the tractor protection valve 310

Then four new air lines are used to connect the shuttle valves to the treadle valve of the retrofit circuit by connecting the shuttle valve to the poppet valves 102-3, 102-4 on the output side of the retrofit treadle valve 101.

Several variations to the arrangements discussed above are possible, while still obtaining the same advantages. For example:

1) One or more of the shuttle valves 104 could be replaced by three-way, two-position (3/2) directional control valves. In such an arrangement, to replicate the behavior of outputting the maximum of the two input pressures, pressure transducer(s) may be used to monitor both pneumatic inputs to the directional control valve(s), and some electronic logic (such as a comparator) may then determine in which position to place the valve(s).

2) The retrofit treadle valve 101 may be actuated in other ways, such as by a lead screw or a ball screw coupled to a servo motor (e.g., instead of cam coupled to gearbox and servo motor).

3) The retrofit treadle valve 101 may be actuated by a voice coil actuator.

4) The retrofit treadle valve 101 may be replaced by two more directional control valves (resulting in four (4) control valves in total—two for the primary circuit and two for the secondary circuit). One of the added directional control valves would be activated to fill the line (increase the pressure) and one activated to vent the lines (decrease the pressure). Modulating of the two additional control valves would allow proportional control of pressure.

While the various apparatus, systems, and methods has been particularly shown and described with references to example embodiments thereof, it will be understood by those skilled in the art that various changes in form and details may be made therein without departing from the scope of the invention encompassed only by the appended claims.

The invention claimed is:

1. A vehicle brake actuation retrofit apparatus comprising:
    a retrofit pneumatic circuit, coupled to a vehicle brake system to preserve a braking function of the vehicle brake system as activated by a primary driver foot pedal,
    a secondary actuator, coupled to the retrofit pneumatic circuit and configured to activate the vehicle brake system separately and independently of the primary driver foot pedal, and also configured so that when both the primary driver foot pedal and the secondary actuator are actuating at a given time, a total brake force applied to the vehicle brake system is a maximum of a pneumatic force provided by the primary driver foot pedal and the secondary actuator;
    a retrofit proportional valve coupled via a shuttle valve to a vehicle proportional valve associated with the primary driver foot pedal;
    wherein the retrofit proportional valve is functionally equivalent to the vehicle proportional valve;
    a controller, configured to control the pneumatic force provided by the secondary actuator; and
    additionally comprising:
    one or more directional control valves disposed to isolate both an input and an output portion of the retrofit pneumatic circuit, and to enforce positive shutdown of the controller to prevent a malfunction, such that at least one directional control valve blocks supply pressure to prevent bleeding the apparatus where pressure is requested while the controller configures the apparatus in a disabled state, and such that at least one other directional control valve vents built-up pressure to atmosphere so that any residual pressure does not actuate the vehicle brake system.

2. The apparatus of claim 1 wherein either or both of the vehicle proportional valve and retrofit proportional valve convert a shaft deflection input into a pressure output.

3. The apparatus of claim 1 additionally comprising:
    a motor, configured to drive a rotary shaft with a cam, wherein the cam is arranged to push a piston whose deflection is controlled by the controller and in turn provided as an input to the retrofit proportional valve.

4. The apparatus of claim 1 wherein the one or more directional control valves furthermore prevent activation of the apparatus in a low pressure condition.

5. The apparatus of claim 4 wherein the one or more directional control valves are configured to provide a path to shed excess residual pressure when the controller transitions the apparatus from an active state to the disabled state.

6. The apparatus of claim 5 wherein the vehicle brake system includes both a primary and secondary pneumatic supply, and the apparatus additionally comprises:
    a pair of input side control valves coupled to respective ones of the primary and secondary pneumatic supply;
    a pair of output side control valves coupled to respective ones of the primary and secondary pneumatic supply; and
    wherein the output side control valves are enabled by a same control signal as the input side control valves.

7. The apparatus of claim 6 additionally comprising:
    pressure transducers, configured to monitor one or more pressures provided by the primary pneumatic supply and the secondary pneumatic supply, primary and secondary brake pressures, or one or more control valves that regulate any or all of these pressures.

8. The apparatus of claim 7 wherein pressure signals output by the pressure transducers are detected, converted to digital data, and read by a programmable controller, to enable the controller to trigger a fault signal if any of the detected pressures are out of range.

9. A retrofit apparatus for a braking system of a vehicle comprising:
- a housing;
- a retrofit treadle valve, disposed within the housing, and coupled via a shuttle valve to a vehicle treadle valve associated with a driver foot pedal;
- an input primary poppet valve and an input secondary poppet valve, connected to a respective one of a primary and a secondary pneumatic brake pressure supply of the vehicle, arranged to block the respective primary and secondary pressure supply in a deactivated state of the retrofit apparatus;
- an output primary poppet valve and an output secondary poppet valve, connected to an output side of the retrofit treadle valve, and arranged to block the output of the retrofit treadle valve in the deactivated state of the retrofit apparatus; and
- a primary shuttle valve and a secondary shuttle valve, with a first input port coupled to a respective one of the primary or secondary output poppet valves, and with a second input port coupled to respective one of the vehicle treadle valve or retrofit treadle valve, and with an output port coupled to control a vehicle primary relay valve or a vehicle secondary relay valve.

* * * * *